Jan. 24, 1939.  G. BITZER  2,145,023
KNITTING MACHINE YARN CONTROL
Filed Feb. 18, 1937  10 Sheets-Sheet 1
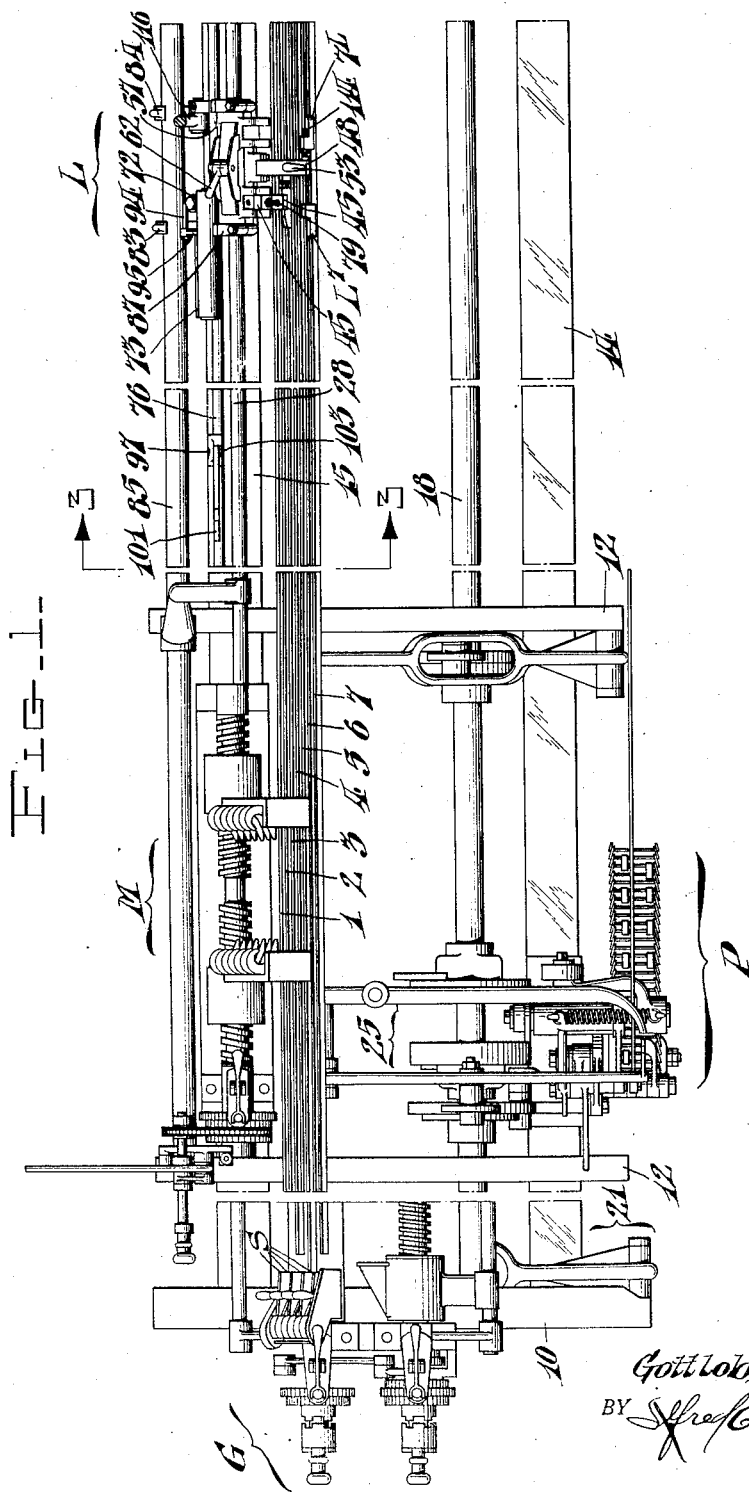
INVENTOR:
Gottlob Bitzer,
BY
ATTORNEY.

Jan. 24, 1939.   G. BITZER   2,145,023
KNITTING MACHINE YARN CONTROL
Filed Feb. 18, 1937   10 Sheets-Sheet 2
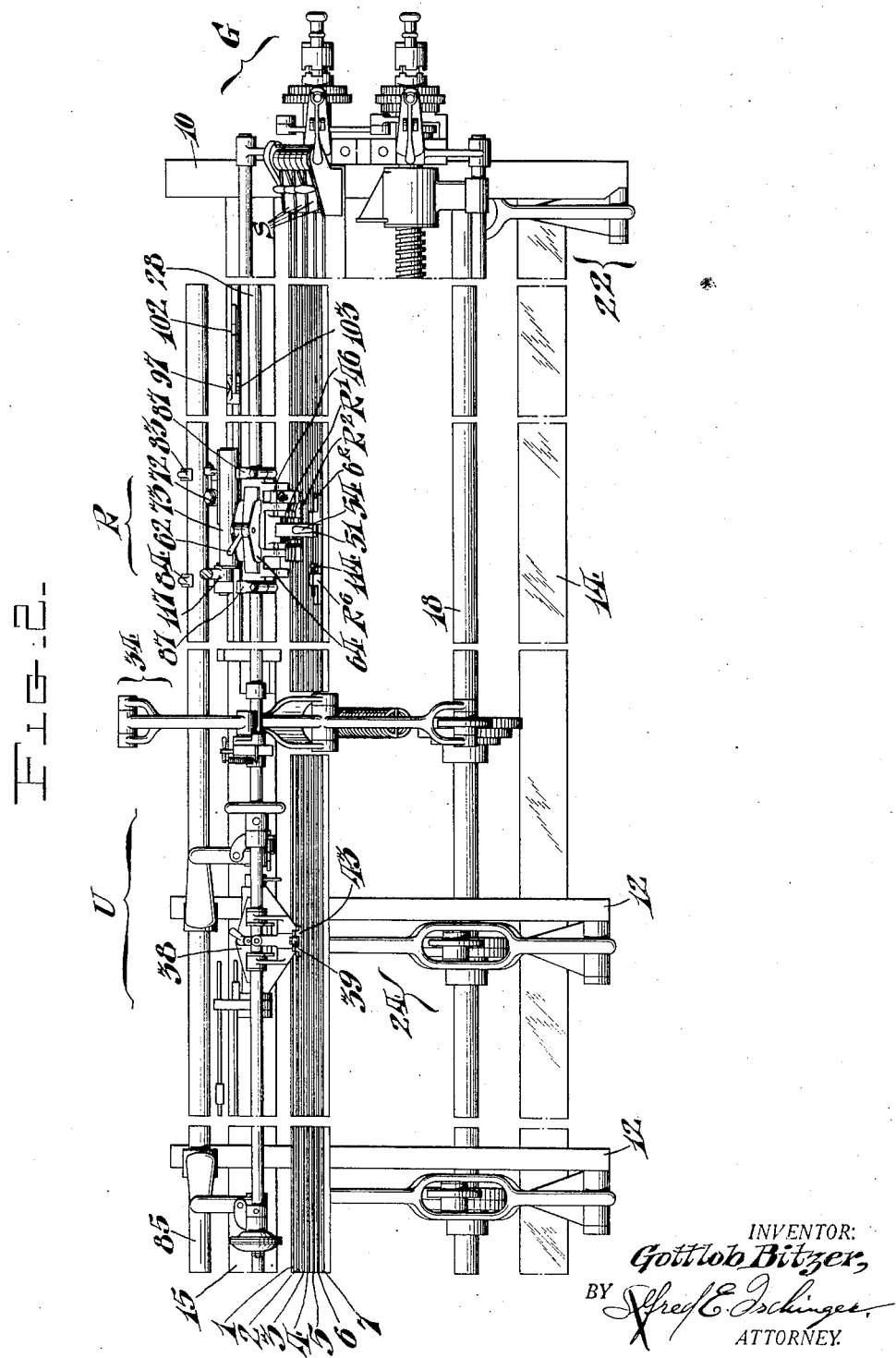
INVENTOR:
Gottlob Bitzer,
BY Alfred E. Ischinger
ATTORNEY.

Jan. 24, 1939.  G. BITZER  2,145,023
KNITTING MACHINE YARN CONTROL
Filed Feb. 18, 1937   10 Sheets-Sheet 3
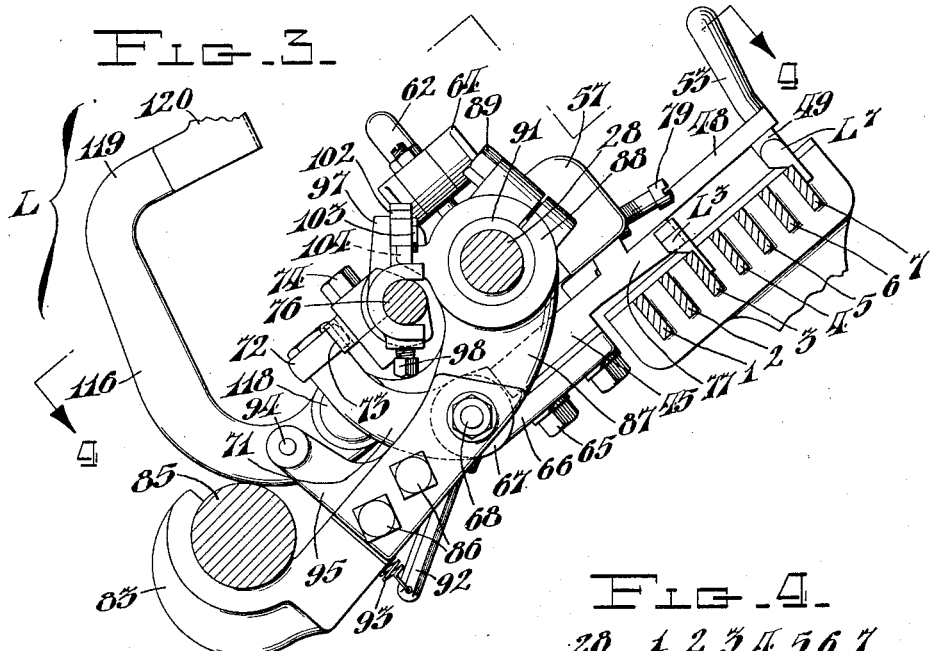
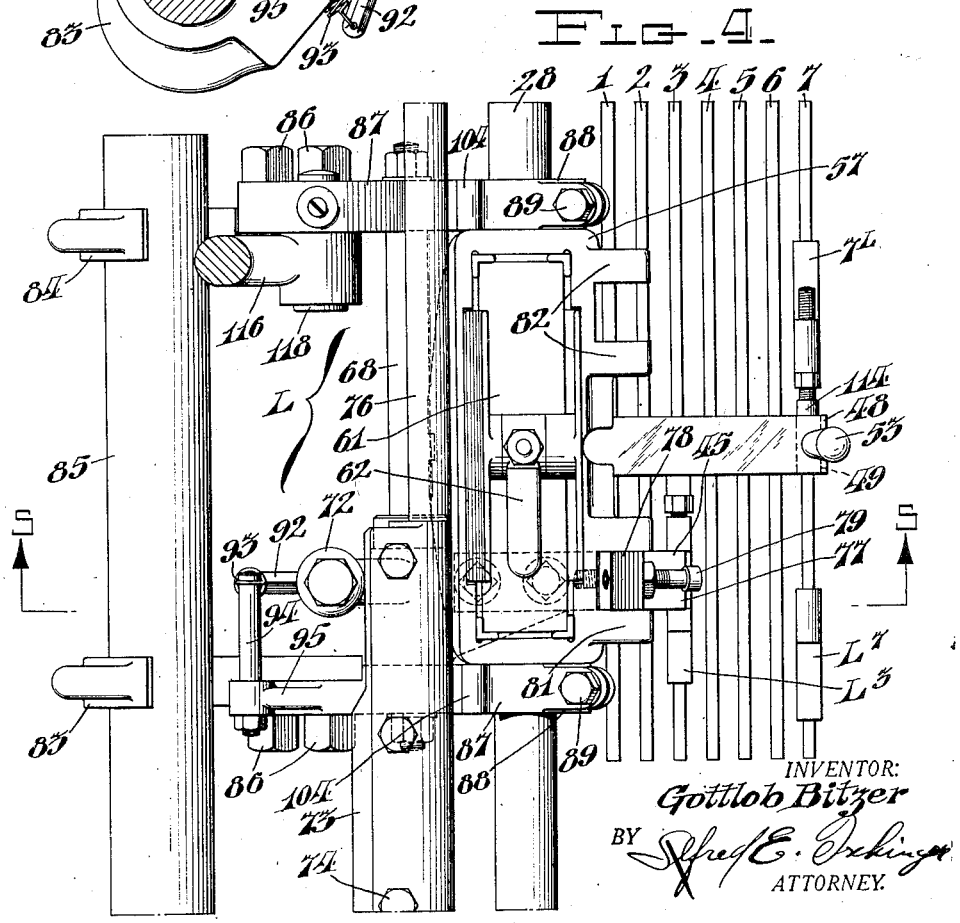
INVENTOR:
Gottlob Bitzer
BY
ATTORNEY.

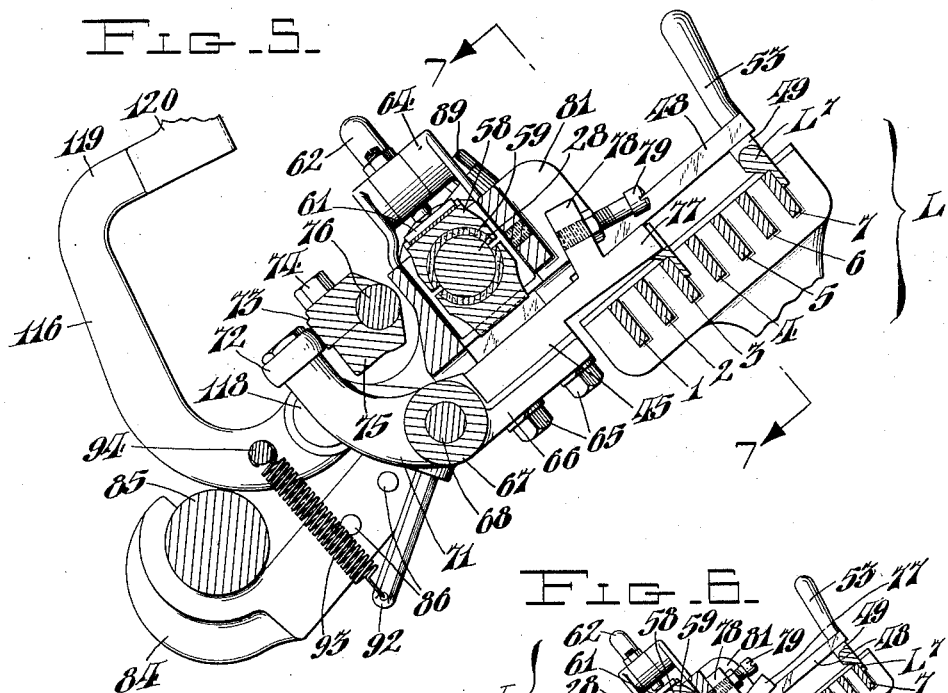
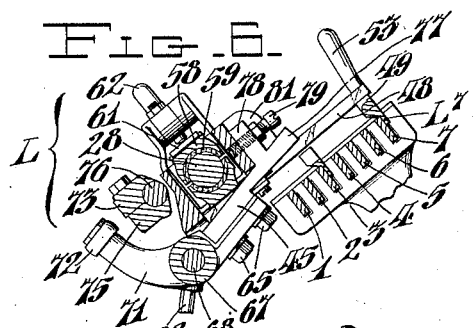
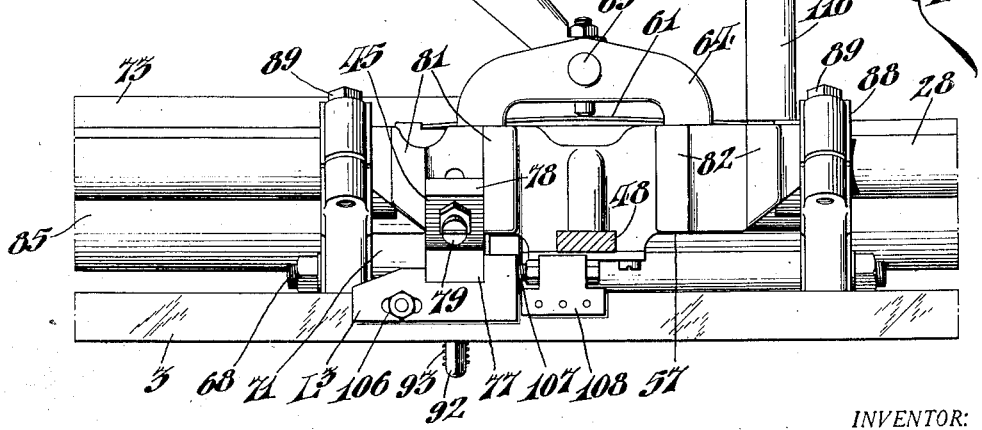

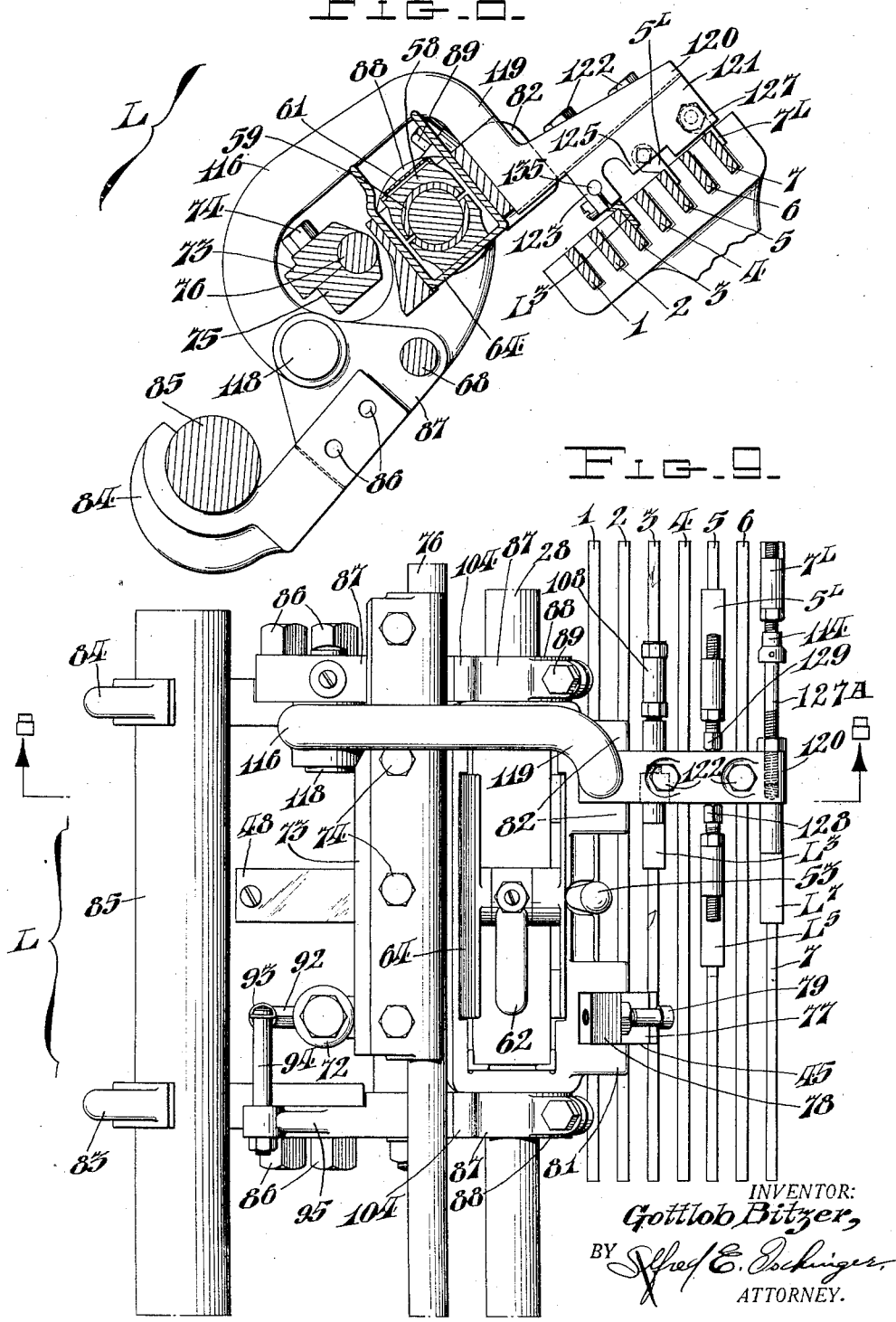

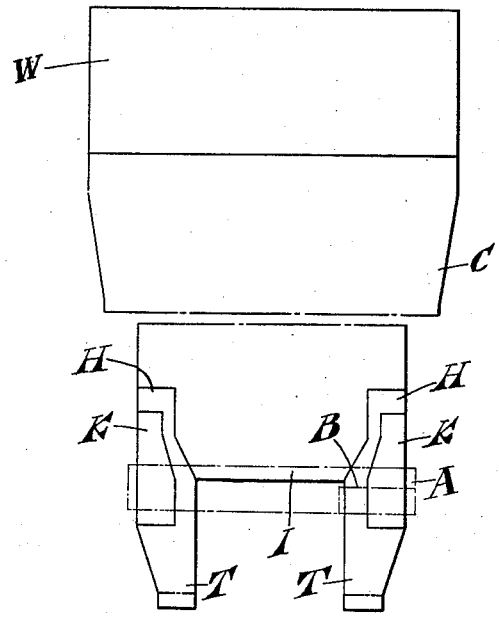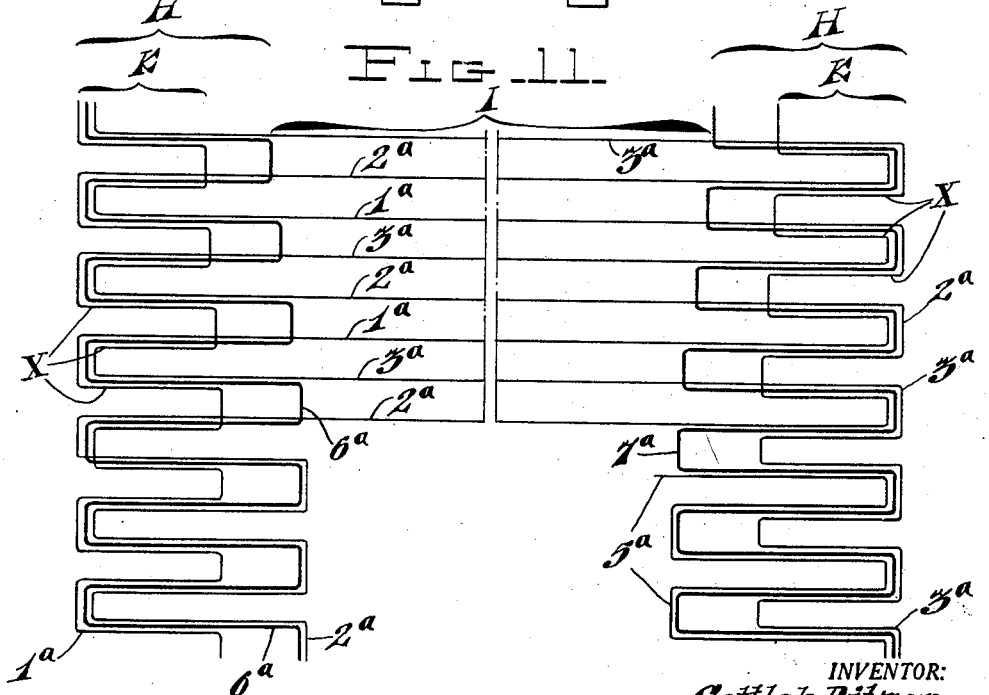

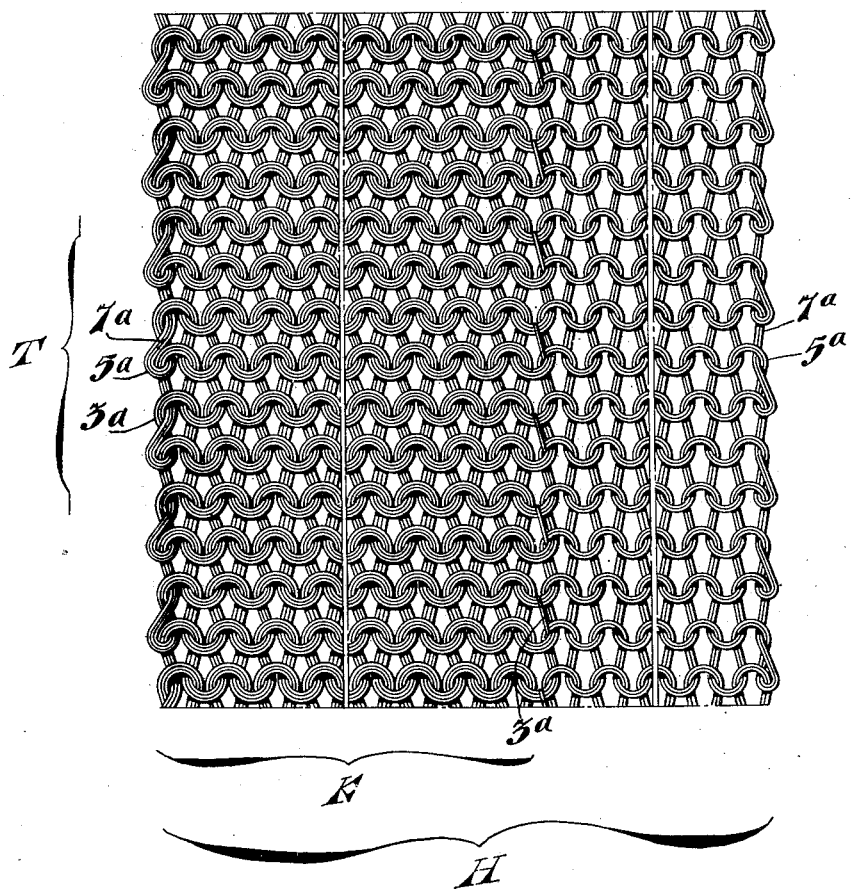

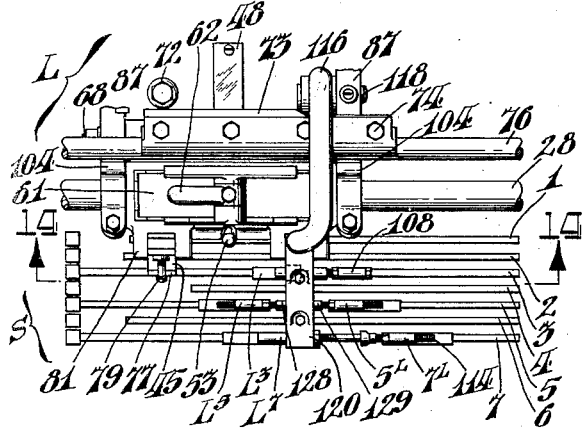

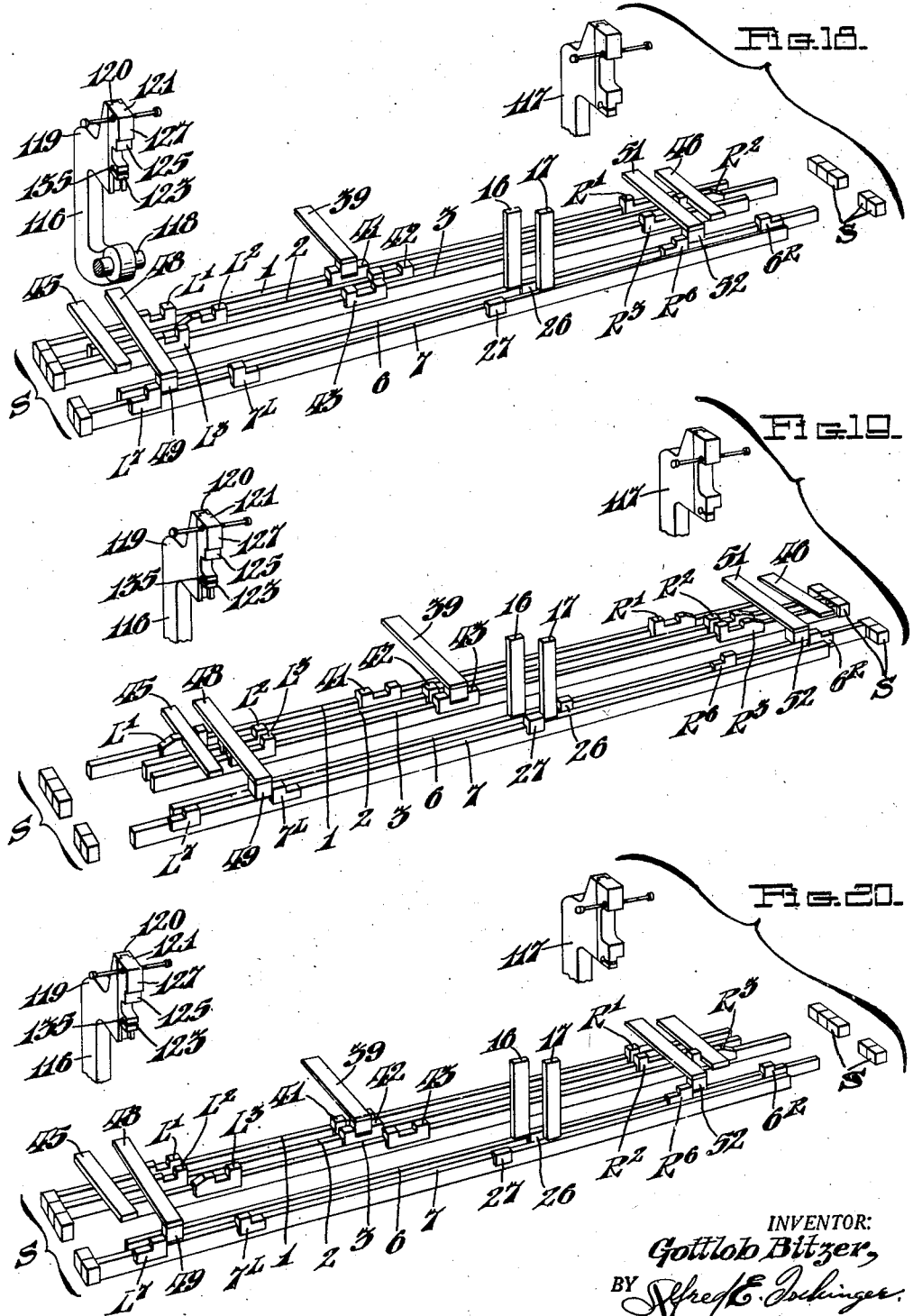

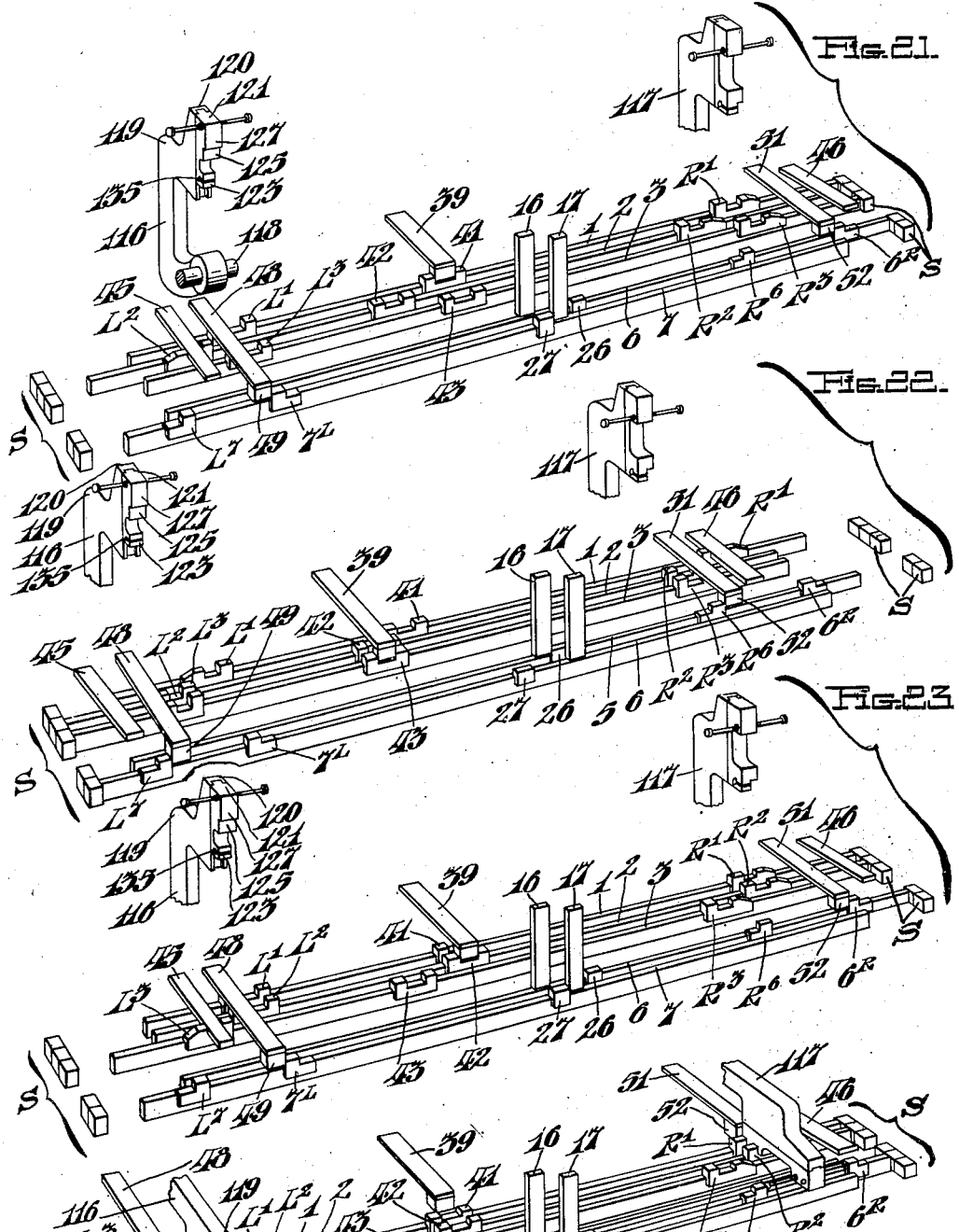

Patented Jan. 24, 1939

2,145,023

UNITED STATES PATENT OFFICE 2,145,023

KNITTING MACHINE YARN CONTROL

Gottlob Bitzer, Lincoln Park, Pa., assignor to Textile Machine Works, Wyomissing, Pa., a corporation of Pennsylvania Application February 18, 1937, Serial No. 126,328

16 Claims. (Cl. 66—129)

My invention relates to yarn manipulating means for knitting machines, and particularly to means for laying yarns in reinforced areas of full-fashioned stocking blanks.

A blank of this kind, made of fine silk, usually comprises a body web of single yarn thickness and reinforced areas of multiple yarn thickness, as in the upper heel areas having body webbing between them, and heel tab areas, between which there is no body yarn.

If yarn of the body web is laid by a single yarn carrier, two extra yarn carriers are ordinarily required to lay each upper heel-in-heel area, thus making a total of five carriers each operated by a separate friction box on the one friction rod.

Under the "ringless" stocking principle employing three separate body yarns laid in recurrent sequence, by separate carriers, laying the upper heel-in-heel areas in a blank of the above-indicated character requires the use of seven carriers, but since three of them are operated sequentially by a single friction box, the heat of friction between the friction boxes and the rod is substantially the same as in knitting the single body yarn blank.

Also, in knitting a blank of the above-indicated character, when the heel tabs are knitted, the body web between the tabs is discontinued so that to lay three yarns in each tab under ordinary methods requires six carriers each operated by a separate friction box on the one friction rod.

Under modern high speed production methods, this heat, caused by the five or six friction boxes operating at the same time on the same friction rod, in knitting the upper heel-in-heel areas and the heel tabs, respectively, is excessive to such extent as to have resulted in different suggestions for overcoming it, among which is the suggestion for circulating a cooling medium through a hollow friction rod.

Another suggestion is contained in copending application, Serial No. 112,448, on Knitting machine yarn control, filed November 24, 1936, by Henry W. Sherman, which has matured into Patent No. 2,112,610, issued March 29, 1938, whereby all of the carriers are operated in the upper heel-in-heel areas by three friction boxes, one of which lays three body yarns in recurrent sequence and the others of which lay usual reinforcing yarns and return the body yarns, when not being used as main body yarns, into the reinforced areas at the sides of the blank to produce the triple yarn or heel-in-heel areas.

The mechanism for practicing the latter suggestion depends for operativeness upon the existence of a body web between the reinforced areas. It is not effective to produce the heel tabs by itself but, when the heel tabs are reached, it must, without the cooperation of my invention, be replaced by a mechanism for knitting the tabs in the usual way, employing six yarn carriers and six friction boxes operated by one friction rod. Thus, although it is effective to provide its beneficial results during a considerable part of the production of a blank, it has the disadvantage mentioned, in producing the heel tabs, of requiring the machine to be operated by the use of six friction boxes according to prior practice.

It is an object of my invention to overcome this disadvantage and to render the device of the copending application capable of effective operation throughout the production of both the upper heel and the lower heel tab areas.

Another object of the invention is to provide a device of the above-indicated character that shall be simple and durable in construction, effective in its operation, and economical to manufacture.

Another object of the invention is to provide an attachment for the above-mentioned purposes, which may be installed in a machine in a short time with substantially minimum change in the machine.

Further objects include the provision of certain interchangeable parts, facilitating manufacture and assembly, and rendering the device more flexible in the selection and adjustment of yarn carrier bars and stops.

With these and other advantages incident to a utilization of the improvement, the invention comprises the parts and combinations thereof set forth in the specification and claims, with the understanding that the several necessary elements may be varied in size, form, texture, relation, combination, operation and other characteristics within the nature and scope of the invention.

Although means are shown by the accompanying drawings for carrying the invention into practical effect, such means are given merely by way of example, without limiting the invention to such of its useful applications which for purposes of explanation are made the subject of illustration.

In the drawings:

Figure 1 is a top plan view on a reduced scale of the portion extending from the left end toward the center of a multi-section full-fashioned knitting machine embodying the invention;

Fig. 2 is a view similar to Fig. 1 of the portion extending from the right end toward the center of the machine;

Fig. 3 is an elevational view taken substantially along the line 3—3 of Fig. 1, enlarged relative thereto, only portions of the improvement showing and these in inactive position;

Fig. 4 is a view taken substantially along the line 4—4 of Fig. 3 and looking in the direction of the arrows;

Fig. 5 is a view taken along the lines 5—5 of Fig. 4 and looking in the direction of the arrows;

Fig. 6 is a view similar to Fig. 5, on a reduced scale relative thereto, certain parts being omitted and the remaining parts being shown in different positions;

Fig. 7 is a view taken substantially along the line 7—7 of Fig. 5 and looking in the direction of the arrows;

Fig. 8 is a view similar to Figs. 3 and 5, taken along the line 8—8 of Fig. 9, showing parts constituting the improvement, in active positions;

Fig. 9 is a view similar to Fig. 4 with the parts positioned as in Fig. 8;

Fig. 10 is a diagrammatic plan view, parts being broken away, of a full-fashioned stocking leg blank which the machine is capable of producing;

Fig. 11 is a diagram showing the manner of laying courses and partial courses of various yarns in an area A indicated in dot-and-dash lines in Fig. 10;

Fig. 12 is a magnified view of loop construction in a heel tab area B, as it comes from the needles, viewed from the front of the machine indicated by dot-and-dash lines in Fig. 10;

Fig. 13 is a view similar to Fig. 9 on a reduced scale relative thereto, certain parts being omitted and showing the remaining parts as positioned at one stage of operation;

Fig. 14 is a view, on a scale larger than that of Fig. 13, taken substantially along a line 14—14 of Fig. 13 and looking in the direction of the arrows, parts being omitted;

Fig. 15 is a view similar to Fig. 13 showing the parts in other positions;

Fig. 16 is a view similar to Fig. 14, taken substantially along the line 16—16 of Fig. 15;

Fig. 17 is a view similar to Fig. 15 showing parts in different positions; and

Figs. 18 to 24, inclusive, are sequence diagrams showing yarn carrier bars, dogs thereon, end stops therefor and elements for controlling or operating the bars, the parts being shown in various positions and relations of operation.

In practicing the invention with a machine for knitting full-fashioned stocking blanks of the so-called "ringless" type, a multi-carrier selector of the prior art, for controlling the body-yarn carriers to lay separate yarns to the loop-forming mechanism in recurrent sequence, comprises a friction box including elements controlled by pattern means of the machine for connecting the box to, and disconnecting it from, the carriers.

Each of two other friction boxes, provided one for each side of a blank, includes a slide for connection to a carrier of a reinforcing yarn different from the body yarns and laid into a main reinforcing heel area above the heel tabs.

Each of the boxes for laying the reinforcing yarn is provided with a cam operated lever for selectively connecting each body-yarn carrier to the reinforcing box when it is not laying a body yarn to the loop-forming mechanism, to lay the second, or heel-in-heel reinforcing yarn. The stops for the various carrier bars, and the dogs for connecting the friction box slides to the bars, are adjustably arranged so that the carriers are reciprocated for selected distances.

The above-mentioned structure and operation are effective to the last course in the upper heel areas wherein a body yarn is also laid entirely across the blank, at which position the improvement hereof operates to complete the heel tabs, which are spaced coursewise from each other and have no body yarn between them.

To lay the first triple-thread courses in the heel tabs, the three-thread selector friction box is laid out of action. Likewise, the slides of the reinforcing friction boxes which connect the latter to the main reinforcing yarn, and the levers which operate the body yarn carriers to lay the heel-in-heel yarns of the upper heel areas, are laid out of action, and further levers constituting the improvement, are placed into position for operation for the first time during the knitting of the blank. Each of the latter levers, disposed on one of the reinforcing friction boxes, comprises a lug, in the nature of a key detachably mounted on the lever whereby, with a choice of any one of a plurality of like lugs adapted for the purpose, any three of the carrier bars may be operated in accordance with the invention, and the three bars selected may be changed by replacing the lug with one of the other lugs of said plurality.

The lugs engage dogs on each of two of the carrier bars to maintain these bars in fixed relation to each other, while being positively moved by the box in unison successively throughout the entire strokes thereof in opposite directions of reciprocation. This action lays two yarns coextensively with each other, and corresponding to a body yarn and first or main reinforcing yarn, respectively, extending entirely across the heel tabs.

Each lug also has a preliminary lost motion action relative to a dog on a third carrier bar whereby a third yarn is laid to produce the heel-in-heel area, so that, by my invention, in combination with the device of the above-mentioned copending application, a full-fashioned stocking leg blank having heel-in-heel areas may be knitted entirely by six carriers, operated by only three friction boxes.

The drawings illustrate only those members of a "Reading" full-fashioned stocking knitting machine necessary for an understanding of the invention. Loop-forming and other mechanisms and the operation thereof, are well known, as set forth in the "Reading" Full Fashioned Knitting Machine catalogues, copyright 1920, 1929 and 1935, and published by the Textile Machine Works, Reading, Pennsylvania, and in a booklet entitled "Knitting Machine Lectures" published in 1935 by the Wyomissing Polytechnic Institute, Wyomissing, Pennsylvania.

Referring to Figs. 1 and 2, a machine for which the invention is adapted generally comprises a framework or supporting base structure for the operating elements, including end frames 10, center frames 12 and means including front and back beams 14 and 15, respectively, extending along the machine for holding the frames 10 and 12 together.

The machine further comprises a cam shaft 18 supported by the frames 10 and 12, yarn-carrier bars 1 to 7, inclusive, narrowing carriages G for supporting carrier bar end stops S, cam and lever assemblies 21 and 22 for operating the carriages G from the cam shaft 18, narrowing lift cam and lever assemblies 24 associated with the narrowing carriages G, cams 25 for shogging the cam shaft 19, friction rod means 28, a carriage structure M for controlling reinforced selvage stops for all of the carrier bars 1 to 7, but in which only the stops 16 and 17 associated with dogs 26 and 27 on the carrier bars 6 and 7, respectively, Figs. 18 to 23 are of interest herein, a selector mechanism U for connecting carrier bars to, and disconnecting them from, the friction rod 28, a cam and lever assembly 34 for operating by the selector mechanism U, and a pattern device or chain motion mechanism P for controlling certain members to operate in predetermined sequence.

The selector mechanism U, set forth in copending application, Serial No. 677,443, filed June 24, 1933, by Gustav Gastrich on "Yarn feeding mechanism for straight knitting machines," comprises a special alternating carrier friction box 38, including a slide 39 for cooperation with dogs 41, 42 and 43 on carrier bars 1, 2 and 3, respectively, to connect the latter to, and disconnect the same from, the friction rod 28 whereby corresponding separate yarns may be laid to the loop-forming mechanism of the machine in repeated numerical sequence in accordance with the "ringless" stocking knitting principle.

Splicing friction boxes L and R, shown generally in Figs. 1 and 2, and parts of which are shown in Figs. 18 to 24, inclusive, are substantial duplicates; the box L including an arm 45 for cooperation with dogs L1, L2 and L3 on the carrier bars 1, 2 and 3, respectively, and the box R including an arm 46 for cooperation with dogs R1, R2 and R3 on the carrier bars 1, 2 and 3, respectively. The box L further includes a slide 48 having a lug 49 for cooperation with dogs L7 and 7L on the carrier bar 7. Similarly, the box R includes a slide 51 having a lug 52 for cooperation with dogs R6 and 6R on the carrier bar 6. Handles 53 and 54 are provided on the slides 48 and 51 respectively.

Referring particularly to Figs. 3 to 9, inclusive, the box L comprises a housing 57, including usual friction pads 58 and shoes 59 held to the friction rod 28 by a bowed leaf spring 61 and an operating handle or cam lever 62 pivotally mounted on a pin 63 journaled in a clamp member 64 associated with the housing 57.

The arm 45 is secured, as by screws 65, to one arm 66 of a lever 67 pivotally mounted on a shaft 68 and having another arm 71 carrying a roller follower 72 for coaction with a stationary cam bar 73. The latter is formed as a clamp member, as shown in Fig. 5, secured by screws 74 to a complementary clamp member 75 against a stationary rod support 76 which is secured to the machine frame.

The arm 45, for cooperation with the three-carrier dogs L1, L2 and L3, has a free end portion 77 to accurately fit in a top recess between a pair of projections on each of these dogs, and a projection 78 supporting a screw 79 which, as indicated in Fig. 6, is for insertion into a screw hole in the front side of the box housing whereby to lock the arm 45 in inactive position. The arm 45 is disposed between side projections 81 which reinforce the arm against side thrust when the box is moving a carrier bar. The arm 45 is adapted to be dropped into a slot in any one of the dogs L1, L2 and L3, and the arm 46 similarly operated with respect to the dogs R1, R2 and R3, by action of the follower 72 on the cam 73 at the beginning of a stroke. Near the end of a stroke, the arm 45 or 46, as the case may be, is moved upwardly in the slot for complete removal from a dog on one or the other of alternating carriers 1, 2 and 3, but in the meantime acts as a rebound stop, as pointed out in the first mentioned copending application.

The box L is provided with another pair of side projections 82 like the projections 81 in order that it may be interchangeable with the friction box R. The housings R and L are duplicates and, when assembled, the corresponding lever 67 is mounted so that the arm 45 operates either between the projections 81 or the projections 82 depending upon whether the assembled structure is to be used in the place of the box R or the box L.

Hook like arms 83 and 84 embrace a back narrowing shaft 85 and are secured, as by screws 86, to members 87 having split collar portions 88 secured by screws 89 to sleeves 91 integral with the box housing at the ends thereof. This structure operates as a slide guide for the box to prevent it from turning about the friction rod.

An arm 92 of the lever 67 is connected by a spring 93 to a pin 94 carried by a projection 95 on the member 87 associated with the hook 83 to bias the follower 72 toward the cam 73 and the free end 77 of the arm 45 toward the dogs R1, R2 and R3 on the carrier bars 1, 2 and 3, respectively.

As better seen in Figs. 1, 2 and 3, stationary supports 97 are clamped to the rod 76, by screws 98, for pivotally supporting hook-like levers 101 and 102 on pins 103.

In the inoperative position of the friction box L, corresponding to a position of its carriers outside the knitting field, the associated lever 101 is turned through an angle of approximately one hundred and eighty degrees from its position of Fig. 1 for hooked holding relation to a lug 104 on the clamp portion 88. The lever 102 similarly cooperates with the friction box R.

As indicated in Figs. 7, 14 and 16, in connection with the dog L3, each of the dogs L1, L2, L3, R1, R2 and R3 is secured to the corresponding carrier bar by a pin and slot connection 106 whereby the longitudinal position of the dog on the bar may be adjustably fixed, after adjustment of a screw 107 in a member 108 fixed to the bar, as by riveting or otherwise.

The dog 7L and the dog R6 are provided with adjustable contact screws 114 for engagement by the slides 48 and 51, respectively.

The structure, as described is substantially the same as that of the first above-mentioned copending application, but differs therefrom in the provision of similar levers 116 and 117 on the splicing friction boxes L and R, respectively, each having a main arm portion of substantially U-shape pivotally mounted on a pin 118 carried by the member 87 associated with the hook 84 at a position near the lower rear portion of the box L. From this position, each of the levers 116 and 117 extends upwardly, in the active position of Fig. 8, at the rear of the box, over the top thereof, and downwardly at the front of the box, thus embracing the sides and top thereof in this position. In inactive position, the lever 116 is positioned, as indicated in Figs. 3 and 5, relative to the friction box L.

At the front of the box, in active position, the lever 116 has a bend terminating in an extension 120 disposed over the carrier bars 1—7 transversely relative thereto, and carrying a lug 121 detachably secured thereto as by screws 122.

The lug 121, in this instance has portions 123, 125 and 127 for cooperation with dogs on carrier bars 3, 5 and 7, respectively. The portion 125 is disposed between adjustable contact screws 128 and 129 on the dogs L5 and 5L, respectively, whereby there is no lost motion between the box L and the carrier bar 5 in either direction of reciprocation. Similarly, the portion 127 is disposed between the contact screw 114 of the dog 7L and the dog L7, whereby there is no lost motion between the box L and the carrier bar 7 in either direction of reciprocation, portion 127 having also an adjustable screw or bolt 127A (Fig. 9) in alinement with screw 114 to contact therewith and to take up the space between portion 127 and the screw 114. In other words, in operation, the bars 5 and 7 are fixed relative to the friction box L for positive movement thereby in opposite directions.

However, the portion 123, carrying a contact screw 135, as better seen in Figs. 14 and 16, is arranged by means of this screw to have a preliminary lost motion relative to the dog L3 and the carrier bar 3 in beginning a stroke in either direction.

Referring to Fig. 10, a full-fashioned stocking leg blank which the above described machine is adapted to knit, comprises a welt W, a leg portion C, reinforced heel areas H and heel-in-heel reinforced areas K. The areas K extend from upper heel areas, between which is disposed an instep area I, to positions well into heel tab portions T between which there is no fabric or web. In both Figs. 10 and 11, the fabric is indicated in the position which it occupies in service, which is inverted from the position in which it comes from the machine viewed from the front. Therefore, wherever parts are referred to herein as "right" or "left", it is to be understood that these terms apply to the parts as viewed from the front of the machine, and that the parts of Figs. 10 and 11 are reversed so far as reference to right and left is concerned.

As indicated diagrammatically in Fig. 11, the blank in the areas H and K opposite the instep area I is made up of three separate body yarns 1a, 2a and 3a, and two reinforcing yarns 6a and 7a, of which the yarns 6a and 7a occupy the areas H above the heel tabs T, and the main body yarns 1a, 2a and 3a are not only laid to the knitting head of the machine in full courses from selvage edge to selvage edge, but are each brought back into the fabric between the triple spaced full courses thereof in a series of short courses X occupying the heel-in-heel areas K.

In producing the leg blank, yarn is laid in a usual manner through the welt. The alternating principle is employed in the main leg portion to lay the yarns 1a, 2a and 3a from a position at or near the welt W to the top of the areas H. Although these yarns are continued to the bottom of the instep area shown, at the beginning of the areas H, the yarns 6a and 7a are laid over the yarns 1a, 2a and 3a to the top of the areas K where, in addition to the yarns 6a and 7a, the relatively short lengths X of the yarns 1a, 2a and 3a are brought back into the fabric, after completing full courses, to form the areas K.

This action of the carriers, from the tops of the areas K to the bottom of the instep area I may be better understood from Figs. 18 to 24, inclusive.

In Figs. 18 to 23, inclusive, the levers 116 and 117 are in inactive positions corresponding to the position of lever 116 shown in Figs. 3, 4, 5 and 7. Also in Figs. 18 to 23, since the carriers 1, 2, 3, 6 and 7 are the active carriers, and the carriers 4 and 5 are inactive, the latter are omitted from the figures for clearness. In Fig. 24, carrier 5 comes into play with carriers 1, 2, 3, 6 and 7, and is shown in this figure. Carrier 4 remains inactive in the operation of Fig. 24 and is omitted from this figure also.

As seen in Fig. 18, the carrier bars have reached the end of a movement from right to left, as viewed from the front of the machine, in which the carrier bar 1 has been moved by the slide 39, the carrier bars 3 and 7 have been moved by the left-hand splicing friction box L, against the left end stops S, and the carrier bars 2 and 6 have been moved by the right-hand splicing friction box R. The bars 2 and 6 come to a stop when the dog 26 on the bar 6 engages the reinforced selvage stop 16. Fig. 18 also shows that the connecting arm 45 of the left hand splicing box L has been disengaged from the carrier bar 3 and moved beyond the dogs L1 and L3 on the carrier bars 1 and 3, respectively.

In Fig. 19 the carrier bars have reached the end of their left to right movement in which the carrier bar 3 has been moved by the slide 39, the carrier bars 1 and 7 have been moved by the left hand splicing friction box L, both of these bars coming to a stop by engagement of the dog 27 on the carrier bar 7 with its reinforced selvage stop 17. The carrier bars 2 and 6 have been moved by the right hand splicing friction box R against their right end stops, the connecting arm 46 of the right friction box R being shown disengaged from the carrier bar 2 and moved beyond the dogs R2 and R3 on the carrier bars 2 and 3, respectively.

In Fig. 20, the carrier bars have reached the ends of their right to left movement in which the carrier bar 2 has been moved by the slide 39, the carrier bars 3 and 6 have been moved by the right splicing friction box R and the carrier bars 1 and 7 have been moved by the left splicing friction box L. The connecting arm 45 of the left friction box L is shown as having been disengaged from the carrier bar 1 and moved beyond the dogs L1 and L2 on the carrier bars 1 and 2, respectively.

In Fig. 21, the carrier bars have reached the end of their left to right movement in which the carrier bar 1 has been moved by the slide 39 of the selector friction box 38, the carrier bars 2 and 7 have been moved by the left splicing friction box L, and the carrier bars 3 and 6 have been moved by the right splicing friction box R. The connecting arm 46 of the right friction box R is shown as having been disengaged from the carrier bar 3 and moved beyond the dogs R1 and R3 on the carrier bars 1 and 3.

As seen in Fig. 22, the carrier bars have reached the ends of a movement from right to left in which the carrier bar 3 has been moved by the slide 39 of the friction box 38 of the selector mechanism U to lay yarn to the loop-forming mechanism of the machine from edge to edge of the blank, the carrier bars 2 and 7 have been moved by the arm 45 and the slide 48, respectively, from the inside edge of the left reinforcement to the left selvaged edge by the left splicing friction box L, and the carrier bars 1 and 6 have been moved from the right selvaged edge to a position at the inside edge of the right reinforcement by the arm 46 and the slide 51, respectively. The movable connecting arm 46 of the right hand box R remains in engagement with the carrier bar 1. The movable connecting arm 45 of the left friction box L is shown as having been disengaged from the carrier bar 2 and moved beyond the dogs L2 and L3 on the carrier bars 2 and 3, respectively.

The arms 51 and 48 for connecting the splicing friction boxes R and L to the splicing carrier bars 6 and 7, respectively, remain in engagement with the splicing carrier bars at all times during the usual course laying movements thereof; the dogs R6, 6R, L7 and 7L on the splicing carrier bars being so positioned as to provide lost motion between the friction boxes R and L and the carrier bars.

The arms 45 and 46 for connecting the alternating carrier bars 1, 2 or 3 for laying the heel-in-heel reinforcements K are raised at the end of each outward travel of the splicing friction boxes R and L, so that the usual splicing carrier bars, which start moving after the heel-in-heel carrier bars, will be disengaged from the corresponding splicing friction box R or L before the corresponding splicing carrier bar 6 or 7 has completed its yarn laying movement.

In moving from left to right toward the positions of Fig. 23, the carrier bar 2 has been moved by the selector mechanism U and the left splicing carrier bar 7 has been moved by the box L to complete a portion of the yarn laying strokes of these bars before the connecting arm 45 of the left hand box L has been moved to a position where it will engage carrier bar 3 for reinforcing the left selvaged edge.

As seen in Fig. 23, all the carrier bars have reached the ends of their movement from left to right in which the carrier bar 2 has been moved by the slide 39, the carrier bars 3 and 7 have been moved by the left hand splicing friction box L and the carrier bars 1 and 6 have been moved by the right hand splicing friction box R. Fig. 23 also shows that the connecting arm 46 of the right hand box R has been disengaged from the carrier bar 1 and moved beyond the dogs on the carrier bars 1 and 2 so that in the next right to left movement of the carrier bars, the carrier bar engaged by the selector mechanism U will be moved through a portion of its yarn laying stroke, and the right hand friction box R will engage the remaining alternating carrier. Thus it will be seen that, in moving the carrier bars, for laying the main body yarn, in advance of the carrier bars laying the heel-in-heel splicing yarns in the upper heel areas, the splicing friction boxes will not interfere with the usual operation of the selector mechanism.

At this stage of operation, the feeding of yarns 7a and 6a is continued, as in the upper heel areas, down through the heel tabs for the full widths of the latter, Fig. 12. However, laying of the body yarns 1a, 2a and 3a entirely across the blank is discontinued. The yarn 2a in the right-hand heel tab and a yarn 5a which is brought into the knitting field in the left-hand heel tab are laid simultaneously with the yarns 6a and 7a entirely across the corresponding heel tabs.

The yarn 1a and the yarn 3a are laid in the heel-in-heel areas of the right and left heel tabs, respectively.

At the beginning of knitting the heel tabs, the parts are placed in the position indicated in Fig. 24, in which the carrier bars 1, 2 and 3 are disconnected from the alternating friction box 39. This relation of parts is also indicated in Fig. 13, and in Fig. 14 with respect to the carrier bar 3 and its locally associated parts. The slides 48 and 51 are pushed inwardly from the front of the machine by manipulating the handles 53 and 54 to disconnect the friction boxes L and R from the carrier bar 7 and the carrier bar 6, respectively. Each of the arms 45 and 46 is placed in a position corresponding to that of Fig. 6, and the levers 116 and 117 are each placed in a position corresponding to the position of lever 116, Figs. 8 and 9.

In the latter position, the portions 123, 125 and 127 of the lever 116 are ready to operate the carrier bars 3, 5 and 7, respectively. The lever 117 has similar portions ready to operate the carrier bars 1, 2 and 6, respectively.

As pointed out above, with the arm 116 related to the bars 5 and 7 to instantly move these bars in each direction of reciprocation of the box L, provision is thereby made for simultaneously laying two yarns throughout the width of the left-hand heel tab, and with the arm at the same time having the aforesaid lost motion relation to the bar 3, the latter will lay the yarn to form the left heel-in-heel area K starting at the left selvaged edge of the blank and ending short of the inside selvaged edge of the heel tab. Similarly, the right hand splicing box R, through lever 117, operates the carriers 2 and 6 to move them simultaneously and instantly in each direction of reciprocation of the box, and operates the bar 1 to lay yarn to form the right heel-in-heel area K like the bar 3 lays the yarn for the left heel-in-heel area. It is obvious that either arm 116 or 117 may be used without the other if conditions render this desirable. Also, it is obvious that such of bars 1, 2, 3, 5, 6 and 7 as it may not be desired to utilize when using one or both of arms 116, 117 may be "laid out" of the knitting field in known manner.

The sequence of operation, when the lever 116 is connected to the carrier bars 3, 5 and 7 may be seen from another viewpoint in Figs. 13 to 17, inclusive, in Figs. 13 and 14 of which, all of the bars are at the extreme left hand position.

In this position, with the portion 125 of the lug 121 locked against movement along the bars relative to the dogs L5 and 5L, and the portion 127 likewise locked relative to the dogs 7L and L7, the parts are ready for an operative stroke to the right, whereby with the lost motion between the screw 135 in the portion 123 and the dog L3, the bars 5 and 7 are first moved simultaneously, and the bar 3 moved when the screw engages the dog L3, as indicated in Figs. 15 and 16. Thus when the carrier fingers of the bars 5 and 7 reach the inner edge of the left heel tab, the yarn of the carrier 3 has reached the inner limits of the left heel-in-heel area K short of the inside tab edge; the position of the parts under these conditions being indicated in Fig. 17.

The improvements specifically shown and described by which the results of the invention are obtained, may be modified without departing from the invention as set forth in the specification and claims.

I claim:

1. In a straight knitting machine, reciprocable yarn carriers, reciprocating friction means, actuating means carried by said reciprocating means for directly connecting carriers to said reciprocating means in fixed relation to one another for simultaneous positive movement by said reciprocating means throughout the entire strokes thereof in opposite directions, and means for connecting a carrier to said reciprocating means to effect relative yarn laying movement between the carriers connected to said reciprocating means.

2. In a full-fashioned knitting machine, reciprocable yarn carriers, friction rod means, a friction box, and a plurality of means mounted on the box for connecting the carriers to the box including means for connecting certain of the carriers to the box in fixed relation to each other for simultaneous positive movement by the box successively throughout the entire strokes thereof in opposite directions, and means for lost-motion connection to a carrier.

3. In a full fashioned knitting machine, in combination, carrier bars, a friction box rod, one or more friction boxes on said rod, and a lever pivoted on each of said boxes so as to be thrown into driving position relative to the carrier bars or to be thrown out of said driving position, each of said levers having a means for providing a rigid connection with a carrier bar and having a means usable simultaneously with said rigid connection providing a lost motion connection with a different carrier bar.

4. In a full-fashioned knitting machine, reciprocable yarn carriers, friction rod means, a friction box, a plurality of means mounted on the box connecting the carriers to the box including means for connecting certain of the carriers to the box in fixed relation to each other for simultaneous positive movement by the box successively throughout the entire strokes thereof in opposite directions and means for lost-motion connection to a carrier, and means for interchangeably mounting said plurality of connecting means on the box.

5. In a knitting machine, reciprocable yarn carriers, friction rod means, a friction box, means mounted on the box for directly connecting carriers to the box at a position locally associated with the box in fixed relation to each other for simultaneous positive movement by the box successively throughout the entire strokes thereof in opposite directions, and means for connecting a carrier to the box to effect relative yarn laying movement between the carriers connected to the box.

6. In a knitting machine, reciprocable yarn carriers, reciprocable carrier actuator means, a unit driven by the actuator means, means mounted on said unit for directly connecting certain of the carriers to the unit at a position locally associated with the unit in fixed relation to each other for simultaneous positive movement by the unit successively throughout the entire strokes thereof in opposite directions, and means for connecting a carrier to the unit to effect relative yarn laying movement between the carriers connected to the unit.

7. In a knitting machine, reciprocable yarn carriers, reciprocable carrier actuator means, a unit driven by the actuator means, means mounted on the unit including an element bridged directly between a plurality of the carriers for connecting said plurality to the unit in fixed relation to each other for simultaneous positive movement by the unit successively throughout the entire strokes thereof in opposite directions, and means for connecting a carrier to the unit to effect relative yarn laying movement between the carriers connected to the unit.

8. In a full-fashioned stocking knitting machine, reciprocable yarn carrier bars, a friction rod, a friction box, and means for connecting a plurality of the carrier bars to the box in fixed relation to each other for simultaneous positive movement by the box successively throughout the entire strokes thereof in opposite directions, comprising a lever pivotally connected to the box at one position on the box and braced against side thrust by the box at another position on the box.

9. In a straight knitting machine, reciprocable yarn carrier bars, a friction rod, a friction box, and means mounted on the box for directly connecting a plurality of carrier bars to the box at a position locally associated with the box in fixed relation to each other for simultaneous positive movement by the box throughout the entire strokes of said fixedly related bars successively in opposite directions, and for connecting another carrier bar to the box at said position by a lost-motion connection whereby the latter bar is actuated by the box simultaneously with a portion of each of said strokes through a stroke of less distance.

10. In a full-fashioned knitting machine, reciprocable yarn carriers, friction rod means, a friction box, a plurality of means mounted on the box for connecting the carriers to the box including means for connecting certain of the carriers to the box in fixed relation to each other for simultaneous positive movement by the box successively throughout the entire strokes thereof in opposite directions and means for lost-motion connection to a carrier, each of said connecting means including a lever pivotally connected to the box having a carrier bar engaging portion, and means for interchangeably mounting said levers on the box.

11. In a full-fashioned knitting machine, reciprocable yarn carriers, friction rod means, a friction box, a plurality of means mounted on the box for connecting the carriers to the box including means for connecting certain of the carriers to the box in fixed relation to each other and means for connecting certain of the carriers to the box in movable relation to each other, each of said means including a lever pivotally connected to the box, one of said levers being pivoted to the box at a position behind the box adjacent to a lower portion thereof and having an arm for embracing the upright sides and top of the box and another of said levers being disposed under the box, and means for interchangeably mounting said levers on the box and bracing them against side thrusts.

12. In a full fashioned stocking blank knitting machine, reciprocable yarn carrier bars, a friction rod, a friction box, and means mounted on the box for directly connecting a plurality of the yarn carrier bars to the box at a position locally associated with the box in fixed relation to each other for simultaneous positive movement by the box for laying yarns entirely across a heel tab area successively in opposite directions, and for connecting another carrier bar to the box at said position by a lost-motion connection whereby the latter bar is actuated by the box simultaneously with a portion of each stroke of said fixedly related bars through a stroke of less distance for laying yarn in said heel tab area.

13. In a knitting machine, the combination with loop forming mechanism, yarn carriers, friction rod means, mechanism including friction box means for selectively connecting certain of the carriers to, and disconnecting them from, said friction rod means for laying lengths of yarn to the loop forming mechanism in recurrent sequence, means including a friction box separate from said first friction box means, and means mounted on said separate box for directly connecting a plurality of the carriers to the separate box for simultaneous movement thereby positively in both directions for laying during said sequence laying operation lengths of yarn including lengths of said recurrent sequence yarns other than the lengths laid in the sequence and lengths of yarn separate from the yarns of said sequence, of means also mounted on said separate box including means for connecting certain of the carriers to the box in fixed relation to each other for simultaneous positive movement by the box successively throughout the entire strokes thereof in opposite directions, and means for lost-motion connection to a carrier.

14. In a knitting machine, the combination with loop forming mechanism, yarn carriers, friction rod means, mechanism including friction box means for selectively connecting certain of the carriers to, and disconnecting them from, said friction rod means for laying lengths of yarns to the loop forming mechanism in recurrent sequence, means including a friction box separate from said first friction box means, means mounted on said separate box for directly connecting a plurality of the carriers to the separate box for simultaneous movement thereby positively in both directions for laying during the operation of said sequence lengths of yarn including lengths of said recurrent sequence yarns other than the lengths laid in the sequence and lengths of yarn separate from the yarns of said sequence, and means providing a lost-motion connection between said separate box and one of its carriers, of means also mounted on said separate box including means for connecting certain of the carriers to the box in fixed relation to each other for simultaneous positive movement by the box successively throughout the entire stroke thereof in opposite directions, and a second means for lost-motion connection to a carrier.

15. In a full fashioned stocking blank knitting machine, the combination with loop forming mechanism, yarn carriers, friction rod means, mechanism including friction box means for selectively connecting three of the carriers to, and disconnecting them from, said friction rod means for laying lengths of yarns to the loop forming mechanism in recurrent sequence from a leg area above the upper heel areas and in and along said areas in the instep region, means including a reinforcing carrier friction box for each heel area separate from said first friction box means, and means mounted on each of said separate friction boxes for directly connecting a plurality of the carriers to the corresponding box for simultaneous movement thereby positively in both directions for laying during the operation of said sequence lengths of yarn in the corresponding upper heel area including lengths of said recurrent sequence yarns other than the lengths in the sequence and lengths of yarn separate from the yarns of said sequence, of means also mounted on each of said separate boxes including means for connecting certain of the carriers to the corresponding box in fixed relation to each other for simultaneous positive movement by the corresponding box successively throughout the entire strokes thereof in opposite directions in the corresponding heel tab area, and means on each of said separate boxes for lost-motion connection to a carrier.

16. In a full fashioned stocking blank knitting machine, the combination with loop forming mechanism, yarn carriers, friction rod means, mechanism including friction box means for selectively connecting three of the carriers to, and disconnecting them from, said friction rod means for laying lengths of yarns to the loop forming mechanism in recurrent sequence from a leg area above the upper heel areas and in and along said areas in the instep region, means including a reinforcing carrier friction box for each heel area separate from said first friction box means, means mounted on each of said separate friction boxes for directly connecting a plurality of the carriers to the corresponding box for simultaneous movement thereby positively in both directions for laying during the operation of said sequence lengths of yarn in the corresponding upper heel area including lengths of said recurrent sequence yarns other than the lengths in the sequence and lengths of yarn separate from the yarns of said sequence, and means providing a lost-motion connection between said separate box and one of its carriers, of means also mounted on each of said separate boxes including means for connecting certain of the carriers to the corresponding box in fixed relation to each other for simultaneous positive movement by the corresponding box successively throughout the entire strokes thereof in opposite directions in the corresponding heel tab area, and a second means on each of said separate boxes for lost-motion connection to a carrier.

GOTTLOB BITZER.